J. E. HERMAN.
VEHICLE SEAT COVER.
APPLICATION FILED NOV. 28, 1917.

1,317,369.

Patented Sept. 30, 1919.

WITNESSES:

John Edward Herman,
INVENTOR.

UNITED STATES PATENT OFFICE.

JOHN EDWARD HERMAN, OF CINCINNATI, OHIO.

VEHICLE-SEAT COVER.

1,317,369.  Specification of Letters Patent.  Patented Sept. 30, 1919.

Application filed November 28, 1917. Serial No. 204,307.

*To all whom it may concern:*

Be it known that I, JOHN EDWARD HERMAN, a citizen of the United States, residing in the city of Cincinnati, in the county of Hamilton and State of Ohio, have invented a new and useful Vehicle-Seat Cover, of which the following is a specification.

My invention relates to improvements in vehicle seat covers, especially of the automobile class, and the objects of my invention are; first, to provide a vehicle seat cover which will protect the seat against dust and other foreign substances, second, which will protect the occupants against the oils, stains and accumulations of the seat covering, third, which can be instantly removed, reversed or replaced, fourth, which is held securely in place when in use, and fifth, which will lengthen the wear of the seat.

I attain these objects by the device illustrated in the accompanying drawing, in which—

Figure 1:
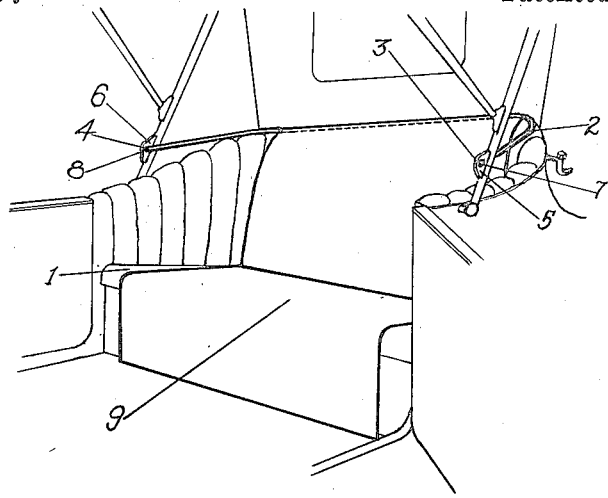
Figure 2:
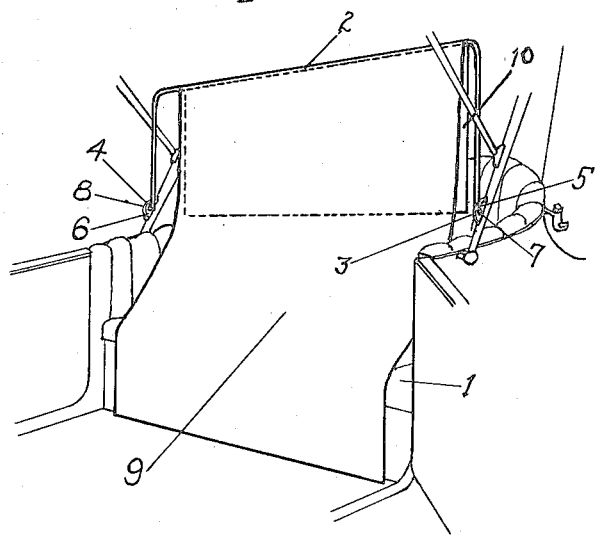

Figure 1 is a plan view of a vehicle seat covered with the seat cover, showing the cover in position, the retaining rod which holds the covering in position and the supports of the rod, and Fig. 2 shows the retaining rod in elevation and the overlapping covering as placed thereon.

Similar numerals refer to similar parts in both views.

Referring to the accompanying drawing by numerals it will be seen that my improved vehicle seat cover comprises a seat 1, a retaining rod 2, provided with arms 3 and 4, supported by supports 5 and 6, having perforations 7 and 8, disposed to serve as bearings to said arms of the retaining rod. A covering 9, overlaps the body portion of said rod with the overhanging portion 10 facing the back of said seat, as shown in Fig. 2.

When said retaining rod, supplied with said covering, is permitted to drop backward in position over the back of said seat it holds securely, when utilized, said covering in position, while said rod, in turn, is maintained securely in its position. Said rod is made preferably of brass or nickeled steel, and the covering of washable material. Said supports may be secured to the arms of the seat or, when convenient, to the frame of the top of the vehicle, as shown. They should be placed slightly lower than the back of the seat, as shown, whereby the proper binding effect is given the retaining rod.

What I claim is:

The combination of a vehicle seat, a rod having arms, corresponding in form to the back and arms of said seat, supports affixed to said arms of said rod and disposed to permit said rod to be raised from or lowered to the back of said seat without detachment, and an unattached covering overlapping requisitely the body-portion of said rod—all constructed, arranged and disposed to provide a seat covering, which is held in position when said rod rests on the back of the seat, and which can be instantly turned upon or removed therefrom.

JOHN EDWARD HERMAN.